United States Patent [19]
Davis et al.

[11] Patent Number: 5,087,365
[45] Date of Patent: Feb. 11, 1992

[54] FILTER WITH ROTATING WIPER HAVING INDEXING BLADES

[75] Inventors: Scott J. Davis, Kalamazoo; Danny K. Kaiser, Three Rivers, both of Mich.

[73] Assignee: Delaware Capital Formation, Inc., Wilmington, Del.

[21] Appl. No.: 538,125

[22] Filed: Jun. 14, 1990

[51] Int. Cl.⁵ ............................................. B01D 25/32
[52] U.S. Cl. .................................. 210/415; 210/408; 210/409; 162/272; 162/274
[58] Field of Search ............... 210/106, 237, 408, 409, 210/413, 414, 415, 424; 162/55, 251, 272, 274

[56] References Cited

U.S. PATENT DOCUMENTS

| | | | |
|---|---|---|---|
| Re. 21,639 | 5/1935 | Trinkle | 210/415 |
| 2,089,215 | 8/1937 | Lomax | 210/408 |
| 3,051,233 | 8/1962 | Baxter | 210/413 |
| 3,168,467 | 2/1965 | Dreyer | 210/415 |
| 3,446,431 | 5/1969 | Marchal et al. | 210/106 |
| 3,511,374 | 5/1970 | Beal | 210/415 |
| 3,976,577 | 8/1976 | Kaiser | 210/340 |
| 4,217,220 | 8/1980 | Elgi et al. | 210/413 |
| 4,220,540 | 9/1980 | Hagihara | 210/415 |
| 4,663,030 | 5/1987 | Chupka et al. | 210/415 |
| 4,880,539 | 11/1989 | Crawford et al. | 210/408 |

Primary Examiner—Peter Hruskoci
Assistant Examiner—Robert James Popovics
Attorney, Agent, or Firm—Flynn, Thiel, Boutell & Tanis

[57] ABSTRACT

A self-cleaning filter comprises a filter element and a housing. A cleaning unit, movable with respect to the filter element, removes filtered-out solids from the upstream face of the filter element. A movable cleaning element is engagable with the filter element. Indexing structure removes the cleaning element from the filter element for removing accumulated solids from the cleaning element while a second cleaning element engages the filter element for cleaning same in substitution for the first cleaning element.

7 Claims, 8 Drawing Sheets

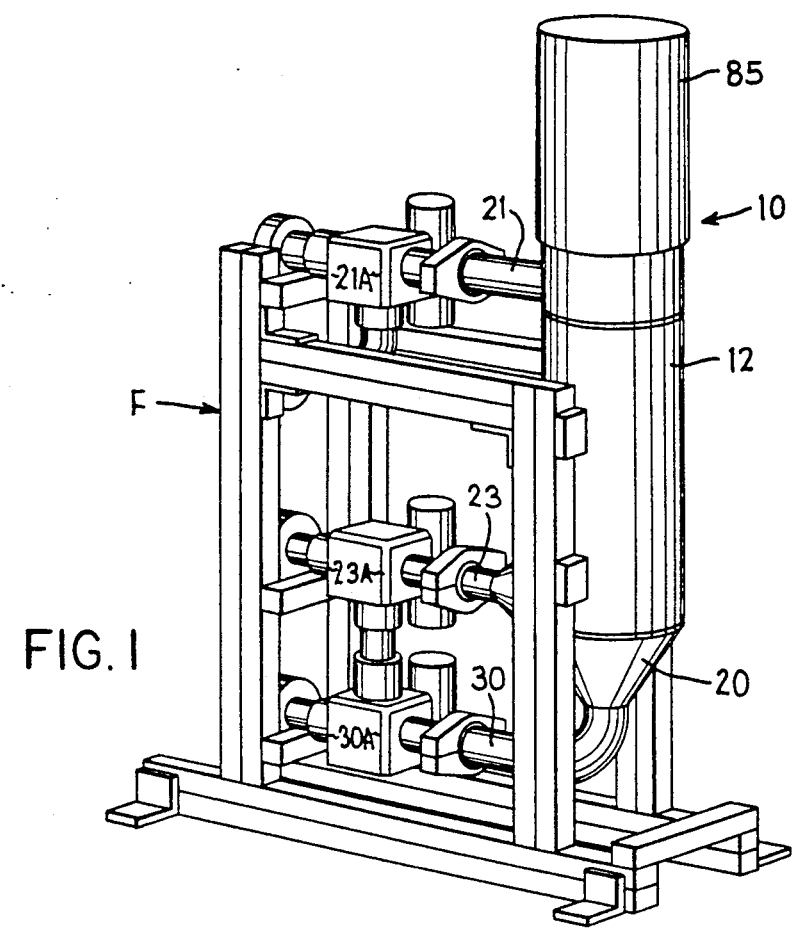
FIG. I
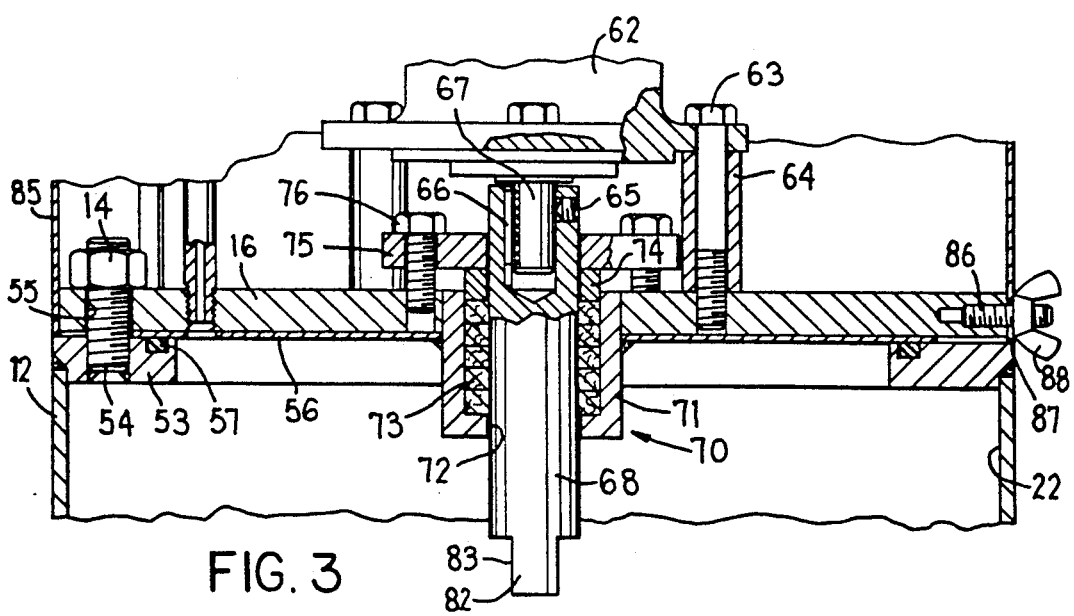
FIG. 3

FILTER WITH ROTATING WIPER HAVING INDEXING BLADES

FIELD OF THE INVENTION

This invention relates to a filter system, and more particularly to a self-cleaning filter system.

BACKGROUND OF THE INVENTION

Self-cleaning pressure filter systems are known. In systems of this kind available from Cellier America of Albany, N.Y., liquid to be filtered enters the interior of a circular cross section, cylindrical filter element, is filtered by passing radially outward through the perforate wall of the filter element and exits as a filtered liquid from the housing containing the filter element. A rotary cleaning unit orbits a longitudinally extending wiper circumferentially along the inner face of the filter element for the purpose of reducing the build-up of filtered-out solids on the inner face of the filter element. In each orbit, the orbiting wiper scrapes over a longitudinally extending, axially tensioned wire within the filter element, for the purpose of scraping solids from the wiper. The purpose is to reduce the amount of backwashing required to maintain filtering efficiency, and thereby to reduce the percentage of down time of the filter system.

However, the present Applicant has noted that prior filter systems of this kind may have unique cleaning problems of their own and that room for further improvement remains. The present invention is intended to overcome these problems.

Accordingly, the objects and purposes of the present invention include provision of a self-cleaning filter system in which a cleaning element movable along the unfiltered liquid side of the filter element cleans filtered-out solids therefrom, in which the cleaning element itself is subject to cleaning of solids accumulated thereon, in which cleaning of the filter element and cleaning element can proceed during filtration, in which several cleaning elements are alternatively located to clean the filter element, in which the buildup of filtered-out solids is minimized both on the filter element and on the cleaning element, in which the filter element may be cleaned by both doctoring and wiping actions, in which a given cleaning element is indexable to different positions with respect to the opposed face of the filter element as it is moved therealong, in which the filter element and cleaning element are readily removed from the filter housing for repair or replacement, and in which the cleaning apparatus can be constructed at relatively low cost from commonly available materials without special tools.

Further objects and purposes of the invention will be apparent to persons acquainted with apparatus of this general type upon reading the following description and inspecting the accompanying drawings.

SUMMARY OF THE INVENTION

A self-cleaning filter comprises a filter element in a housing. A cleaning unit movable with respect to the filter element removes filtered-out solids from the upstream face of the filter element. A movable cleaning element is engagable with the filter element. Indexing structure removes the cleaning element from the filter element for removing accumulated solids from the cleaning element and a second cleaning element engages the filter element for cleaning same in substitution for the first cleaning element.

BRIEF DESCRIPTION OF THE DRAWINGS

FIG. 1 is a pictorial view of a filter unit, and associated piping, embodying the invention.

FIG. 3 is an enlarged fragment of FIG. 2, with portions broken away, to show the cover and a portion of the drive for the cleaning unit of the FIG. 1 apparatus.

DETAILED DESCRIPTION

Figure 2:
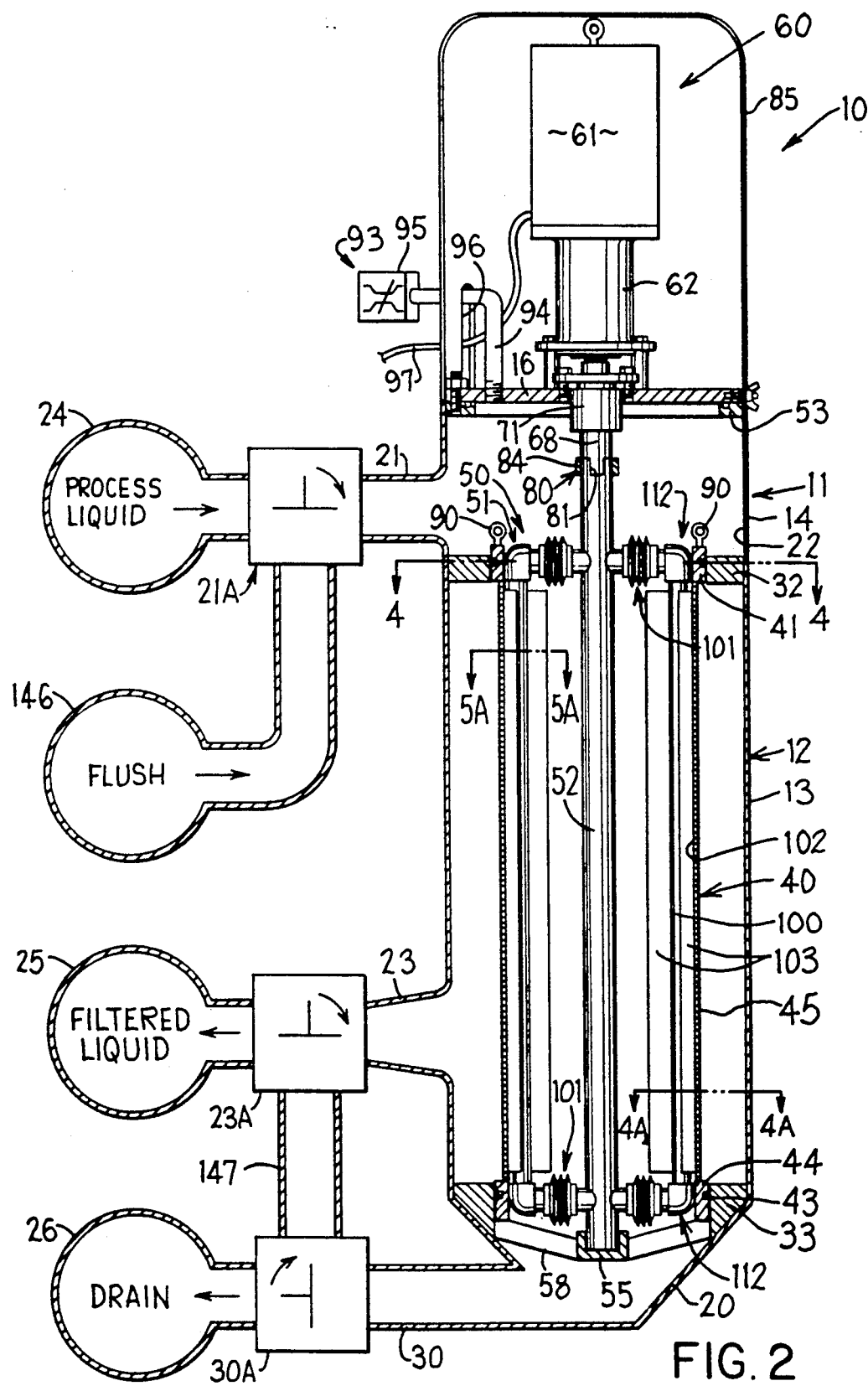
FIG. 2 is an enlarged central cross-sectional view, taken in elevation, of the FIG. 1 apparatus.

A filter unit 10 (FIG. 2) embodying the invention comprises a housing 11 The housing 11 comprises an upstanding, constant circular cross section, tubular casing 12 topped by a removable cover 16. The bottom of the casing 12 is closed by a frustoconical bottom cap 20 welded to the bottom of the casing 12.

A process liquid (liquid to be filtered) inlet conduit 21 (FIG. 2) connects (here radially although a tangential connection is also contemplated) with the upper portion of the casing 12 and opens through the side wall of the upper casing portion into a process liquid chamber 22 defined by the cover 16 and the upper casing portion.

A filtered liquid outlet conduit 23 (FIG. 2) is radially fixedly supported on the side of the bottom portion of the casing 12. The interior of the casing 12 communicates with the outlet conduit 23.

An outlet conduit 30 for solids, separated from the process liquid to form the filtered liquid, fixedly extends radially and horizontally from the bottom of the bottom cap 20, as indicated in FIGS. 1 and 2.

The conduits 21, 23 and 30 may be connected in any desired manner to conventional process liquid, filtered liquid and drain pipes 24, 25 and 26 respectively. For example, process liquid to be filtered is conventionally fed from pipe 24 (FIG. 2) through a normally open valve 21A in the process liquid inlet conduit 21. Filtered liquid is conventionally fed through a normally open valve 23A in the conduit 23 to the filtered liquid pipe 25. The solids outlet conduit 30 is normally closed by a valve 30A during normal filtering operation of the filter unit 10 but is openable to drain collected solids from the filter unit therethrough to the drain pipe 26. The valves 21A, 23A and 30A may be of any conventional type actuable as herein described, e.g. 3-way valves.

An external frame F (FIG. 1) supports the above discussed structure.

Upper and lower rigid rings 32 and 33, of approximately square cross section, are rigidly fixed, as by welding, to the inner surface of the casing 12 between the conduits 21 and 30, and flanking loosely the conduit 23.

A hollow, circularly cylindrical filter element 40 (FIGS. 2 and 5) comprises an annular top collar 41. The top collar 41 is snugly but slidably received within the upper ring 32 and is liquid sealed with respect thereto by means of a conventional annular seal 43, for example, an O ring. The bottom of the filter element 40 is defined by a bottom collar 44 (FIG. 2) which is slidably but snugly received within the ring 33 and is liquid sealed with respect thereto by a suitable annular seal, such as a further O-ring 43.

The O-rings 43 frictionally fix the collars 41 and 44, and thereby the filter element 40 as a whole, against unintended rotation and upward movement with respect to the housing 11, despite orbiting therein of a rotating cleaning unit hereafter described.

The filter element 40 includes a porous filter sleeve 45 (FIG. 5) which may be of any desired rigid conventional construction. In the embodiment shown, the filter sleeve 45 comprises circumferentially close spaced vertical ribs 46 fixed at their ends, as by welding, to the top and bottom rings 32 and 33 and surrounding annular inner ribs 47 which are vertically close spaced and are fixed, as by welding, to the inner faces of the vertical ribs 46 to form therewith a filter mesh. However, it is contemplated that other types of rigid porous filter sleeves may be employed. For example, the filter sleeve 45 may comprise circumferentially close-spaced inner vertical ribs surrounded by annular outer ribs. As a further example, the filter sleeve may comprise a perforated rigid sheet.

To the extent above-described, the apparatus is substantially conventional. Attention is now directed to portions of the apparatus more specifically embodying the invention.

A rotating cleaning unit 50 (FIG. 2) is coaxially disposed within the filter element 40 for rotation therewithin. The rotating cleaning unit 50 includes a rotor 51. The rotor 51 comprises a central shaft 52.

The shaft 52 extends downward coaxially through the process liquid chamber 22 and filter element 40 and is snugly but rotatably received in a bearing cup 55 coaxially fixed to the lower ring 33 and thence to the housing 11, by radiating spokes 58 fixed therebetween as by welding. Thus, the bearing cup 55 positively limits downward displacement of the rotor 51 and assists means hereafter discussed in maintaining coaxial location of the rotor 51 within the filter element 40 during rotation of the rotor 51. The filter element 40 is vertically supported in the housing 11 by any convenient means, hereby resting its bottom collar 44 on the spokes 58.

A radially inwardly extending flange 53 (FIG. 3) is fixed, as by welding, at the top of the casing 12. Circumferentially spaced studs 54 are welded to and extend upward from the flange 53 to protrude upwardly through the holes 55 in the cover 16. A thin stainless steel liner 56 is fixed to the underside of the cover 16 and seats upon a seal ring 57 recessed in the top of the flange 53. The liner 56 is optional but permits the cover 16 to be made of relatively low cost, low carbon steel without fear of corrosion by liquid to be filtered in the underlying chamber 22. Thus, the cover 16 is removable and is installed on the top of the casing 12 to seal the latter.

A rotary drive assembly 60 (FIG. 2, is supported atop the cover 16. The rotary drive assembly 60 comprises a conventional electric rotate motor 61 fixed to and rotationally driving a speed reducer unit 62 in turn fixedly spaced above the cover 16 by circumferentially spaced vertical screws 63 in tubular spacers 64 (FIG. 3).

A set screw 65 and key 66 rotatably drivingly connect the depending rotatably driven drive shaft 67 fixedly to the top end of a depending stub shaft 68.

A seal unit 70 comprises an upward opening seal cup 71 depending down through a central opening in the cover 16 and liner 56 and fixed thereto as by welding. The stub shaft 68 extends loosely and coaxially down through the cup 71 and through a central opening 72 at the bottom thereof. Vertically resiliently compressible annular packings 73 are vertically stacked in the cup 71 around the stub shaft 68. A compression ring 74 surrounds the stub shaft 68 and seats atop the annular packing 73. A horizontal compression plate 75 is fixed by circumferentially spaced screws 76 to the underlying cover 16. The compression plate 75 seats atop the compression ring 74 and has a central opening through which the stub shaft 68 snugly but rotatably depends. Tightening of the screws 76 acts through the compression plate 75 and compression ring 74 to downwardly compress the annular packing 73 against the bottom of the cup 71 to sealingly engage the stub shaft 68 while permitting it to rotate. The stainless steel underliner 56 conveniently blinds the bottom end of the threaded holes in the cover 16 receiving the threaded lower ends of the screws 63 and 76.

The cup 71 of the seal unit 70 and depending stub shaft 68 protrude downward centrally into the process liquid chamber 22 (FIGS. 2 and 3). The top of the shaft 52 protrudes upward into the process liquid chamber 22 in coaxial adjacency with the stub shaft 68. The top of the shaft 52 is rotatably drivingly connected to the bottom of the stub shaft 68 by an axially slidably releasable coupling 80. In the embodiment shown, the coupling 80 comprises a diametral slot 81 in the top of the shaft 52 which receives a depending diametral tongue 82 formed integrally at the bottom of the stub shaft 68 as by machining diametrally oppositely facing flats 83 on opposite sides of the bottom portion of the stub shaft 68. An annular collar 84 fixed, as by welding, coaxially around the top of the shaft 52 positively prevents the tongue 82 from sliding diametrally along the slot 81, and thereby maintains coaxial alignment of the stub shaft 68 and shaft 52, as the stub shaft 68 rotatably drives the shaft 52.

Accordingly, a coaxial rotatable drive is established from the upper drive shaft 67 of the motor driven speed reducer unit 62 downward through the stub shaft 68 and axially slidable coupling 80 to the shaft 52 and hence to the rest of the rotor 51. The electric rotate motor 61 and speed reducer unit 62 are conventional and require no further description.

In the preferred embodiment shown, a light weight, inverted, cup-shaped shroud 85 (FIG. 2) covers the motor 61 and speed reducer 62 and overlaps the peripheral edge of the cover 16, to rest on the upper and radially outer corner portion of the flange 53. The shroud 85 is conveniently releasably held in place by circumferentially distributed studs 86 (FIG. 3), each threaded radially into the edge of the cover 16 and loosely received through a downward opening notch 87 in the lower edge of the shroud 85. A wing nut 88 is threaded on the outer end of the stud 86 and tightened to frictionally hold the lower edge portion of the shroud 85 against the radially outer edge of the cover 16.

In the embodiment shown in FIG. 2, process liquid from the pipe 24 will sometimes carry entrained gases into the top of the filter housing 11 where such gases may become trapped and build up over time to lower the liquid level in the housing 11 and even in the filter element 40. To prevent this problem, an air bleed unit 93 (FIG. 2) comprises a relatively small bore conduit 94 connected at its lower end to the highest point in the housing 11, namely through the cover 16, and extending to a variable restrictive orifice 95 disposed outside the shroud 85. The variable restrictive orifice 95 is manually adjustable in a conventional manner continuously from fully closed to open to either continuously or intermittently vent the top of the housing 11 to the desired extent required to avoid a substantial buildup of air or other gases in the top of the housing 11 and thus to ensure that the liquid level remains above the top of the filter element 40. In the embodiment shown, the conduit 94 is bent and is routed out from within the shroud 85 to the external variable restrictive orifice 95 through a downward opening notch 96 in the lower portion of the shroud 85. The notch 96 may also be used to route an electric power line 97 into the shroud 85 and thence to the motor 61 for energizing same.

A pair of lift lugs 90 (FIGS. 2 and 3) are diametrally spaced on opposite sides of the top of the shaft 52. The lift lugs 90 are upstanding from and fixed (as by welding) to the filter element top collar 41. Thus, the lift lugs 90 act as handles, upon removal of the cover 16, to pull up the filter element 40 out of the casing 12 for repair, replacement or the like.

Turning now in more detail to the rotating cleaning unit 50 (FIGS. 2-6), same further comprises at least one upstanding blade support 100. Top and bottom arm units 101 (FIG. 2) extend radially out from the shaft 52 adjacent the top and bottom of the filter arm unit 40. The arm units 101 carry the top and bottom of the blade support 100 and locate the blade support near the inner face 102 of the filter element. One or more of such blade supports 100 may be provided. When several are provided, same are preferably circumferentially evenly distributed around the shaft 52. In the embodiment shown, two diametrally opposed blade supports are provided.

Figure 5:
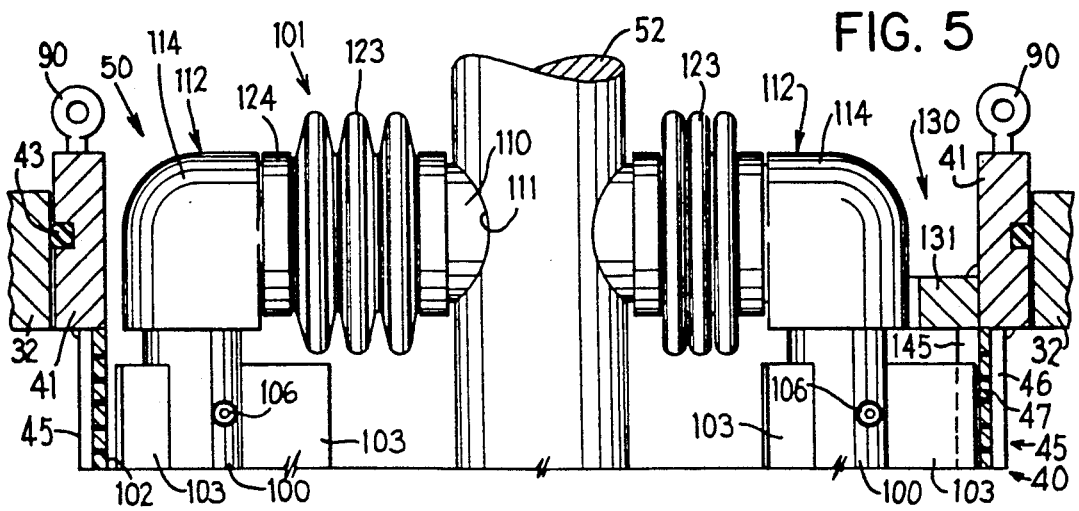
FIG. 5 is a sectional view substantially taken on the line 5—5 of FIG. 4.
Figure 5A:
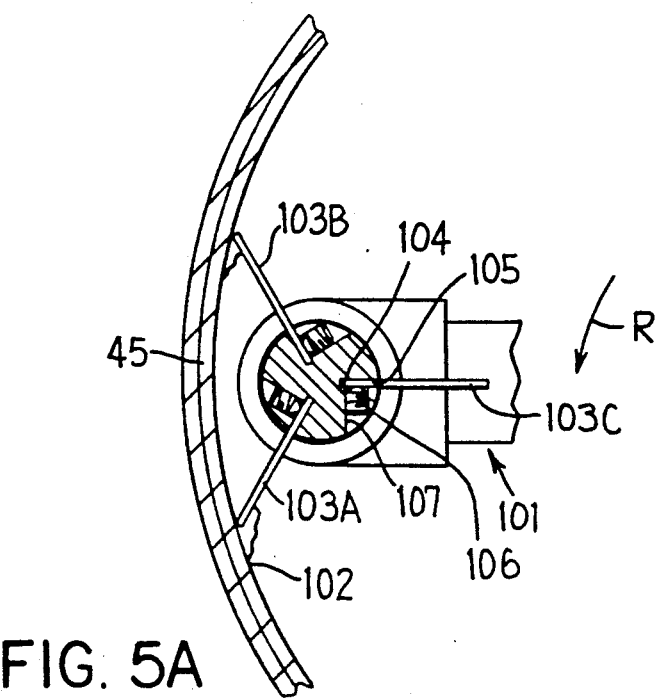
FIG. 5A is a sectional view substantially taken on the line 5A—5A of FIG. 2.
Figure 6:
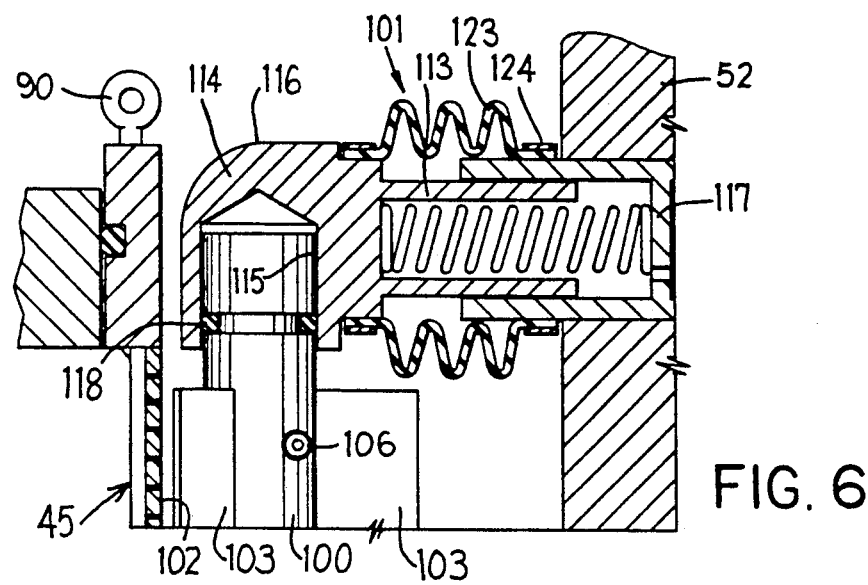
FIG. 6 is a sectional view substantially taken on the line 6—6 of FIG. 4.

Each blade support 100 is formed as an upstanding support shaft supported for pivotal movement about its upstanding longitudinal axis at its top and bottom ends by the corresponding top and bottom arm units 101. Each blade support shaft 100 fixedly supports several (possibly two but preferably three or four) evenly circumferentially spaced, longitudinally extending blades 103 (FIGS. 2, 5 and 5A). In the embodiment shown, three such blades 103 extend radially from each support 100 and are evenly circumferentially spaced at 120° intervals.

The blades 103 extend substantially from the top to the bottom of the filter sleeve 45, nearly to the top and bottom collars 41 and 44 respectively.

The blades 103 are fixed to their respective support shafts 100 preferably in a removable manner. In the FIG. 5A embodiment, the radially inner edge portions 104 of the blades are each received in a respective longitudinally extending, radially opening slot 105 in the support shaft 100. Several set screws 106, distributed along the length of each slot 105, extend chordally into threaded holes 107 in the support shaft 100. The inner ends of the tightened set screws press the opposed inner end portion 104 of the corresponding blade 103 against the far slot side 105 and thereby fix the blade 103 to the support shaft 100. Thus, each blade 103 can be removed from its support shaft 100 by loosening the set screws 106 and sliding the blade 103 radially out of the slot 105. Replacement of the blade 103 is accomplished by a reversal of those steps.

The arm units 101, hereinafter described, are arranged to locate the support shafts 100 so that, at least for most of the circumference of the filter sleeve 45, the radially outer edges of two of the blades 103 bear against the inner face 102 of the filter sleeve 45, as the arm units 101 and shaft 52 rotate within the filter sleeve 45.

The blades 103 are substantially rigid, and preferably are of metal or a suitable rigid plastic material. The outer edge of a blade 103, particularly a metal blade, may be covered with a plastic wear surface, for example to minimize wear on the interior surface of the filter element 40.

Figure 4:
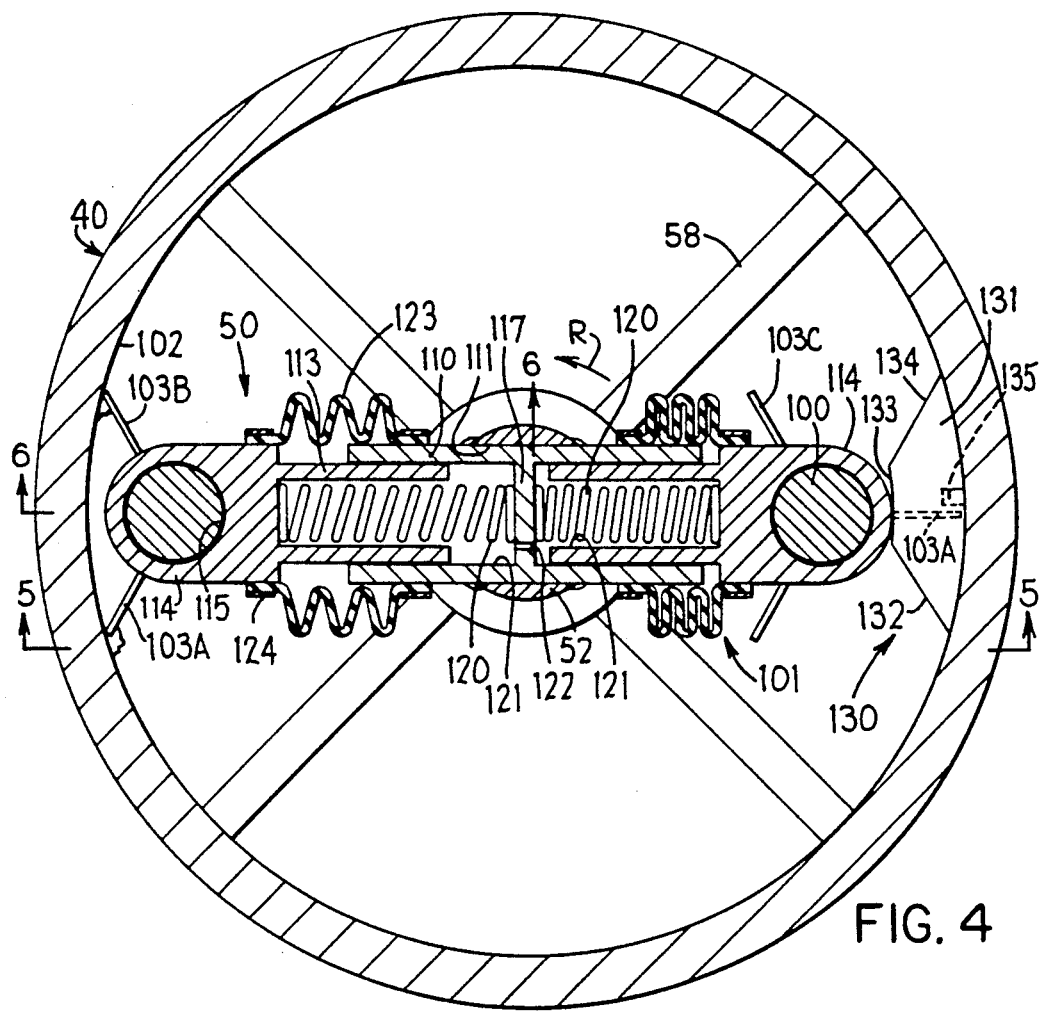
FIG. 4 is an enlarged sectional view substantially taken on the line 4—4 of FIG. 2.

The arm units 101 pivotally support and resiliently urge radially outward the support shafts 100 with respect to the rotatable central shaft 52. In the embodiment shown, the arm units 101 each comprise a rigid central sleeve 110 (FIGS. 4 and 5) extending diametrally through a diametral opening 111 in the central shaft 52 and fixed thereto as by welding. A generally L-shaped carrier 112 (FIGS. 4, 5 and 6) has a radially inwardly extending, elongate, tubular leg 113 slidably telescoped with respect to (here slidably received within) the central sleeve 110 in coaxial relation therewith. The carrier 112 has, at the radially outer end of the leg 113, an upstanding substantially cylindrical head 114. In the embodiment shown, each cylindrical head 114 is rounded at its axially outer end 116 to ease liquid flow therepast. Each head 114 closes the radially outer end of its tubular leg 113 and contains a cylindrical bearing recess 115 (FIGS. 4 and 6) in which the adjacent top or bottom end of the corresponding blade support shaft 100 is received. The head 114 supports the corresponding end of the blade support shaft in the manner of a bearing for permitting free pivoting (i.e., rotation) about the vertical, longitudinal axis of such blade support shaft 100. An annular seal (e.g. O-ring) 118 on each end portion of each blade support shaft 100 seals against the interior peripheral wall of the corresponding bearing recess 115, near the open end of the recess, to prevent process liquid from entering the bearing recess 115. In each head 114, the bearing recess 115 is blind so that the non-recessed end 116 of the head 114 provides an axial stop, or axial thrust bearing, for the blade support shaft 100. Thus, each shaft 100 is rotatably supported and positively axially located by the corresponding, coaxially aligned carriers 112 at its upper and lower ends and is slidable radially toward and away from the filter sleeve 45 by reason of the radially slidable support of the carrier 112 on the central sleeve 110 of each of the upper and lower arm units 101. Each central sleeve 110 has a central, diametrally extending obstruction (e.g., wall or pin) 117 (FIG. 4).

A compression spring 120 urges each carrier 112 radially outward from the central shaft 52. In the preferred embodiment shown, each compression spring 120 is housed in a radially outwardly extending chamber 121 whose ends are bounded by the obstruction 117 and opposed carrier head 114 and whose sides are defined by the hollow telescoping portions of the central sleeve 110 and carrier leg 113. The spring 120 is loosely received at its sides in such chamber 121 but forcefully presses endwise against the obstruction 117 and head 114 to resiliently urge the carrier outward toward the filter sleeve 45. If desired, the two oppositely extending chambers 121 of a given central sleeve 110 may communicate with each other, as would inherently be the case when the obstruction 117 is merely a diametral pin, so there is no tendency for any unwanted change in pressure within the two adjacent chambers 121 as the carriers move radially inward or outward of the central sleeve 110, independently of each other. For example, a bleed port 122 may be provided in the obstruction 117 to equalize the pressure in the adjacent chambers 121.

If the process liquid to be filtered includes hostile materials, for example sticky or abrasive materials, it is desirable to prevent entry of process liquid into the chambers 121 and thus avoid any tendency of the process liquid to interfere with relative radial sliding movement of the leg 113 with respect to the central sleeve 110. To that end, conventional resilient bellows sleeves 123 are each circumferentially clamped, by conventional clamps generally indicated at 124, at their opposite ends to the central sleeve 110 and adjacent portion of the carrier head 114 and prevent entry of process liquid between the telescoping faces of the central sleeve 110 and leg 113. A suitable, conventional, noncompressible liquid here fills the chambers 121 and bellows sleeves 123 to avoid collapsing of the bellows sleeves by the pressure of surrounding process liquid.

To limit the build-up of solids material on the blades 103 as they orbit in contact with the inner face 102 of the filter sleeve 45, indexing structure 130 (FIGS. 4 and 5) is provided for pivoting each blade support shaft 100 periodically (for example, as here shown, once per rotation of the central shaft 52 and hence per orbit of each support shaft 100). A purpose is to substitute another blade for one of the blades 103 which has been orbiting in cleaning contact with the filter sleeve 45, and thus may have picked up filtered-out solids material. A further purpose is to substitute for a blade that has been orbiting in contact with the filter element, another blade which has been cleaned to remove picked up solids while orbiting out of contact with the filter element.

In the embodiment shown in FIGS. 4 and 5, the indexing structure 130 includes an axially (vertically) aligned pair of cams 131 respectively fixed (e.g., integrally or by welding) to the radially inner side of the top and bottom collars 41 and 44 of the filter element 40. The cams 131 are preferably identically located and shaped and sized and have respective lead-in, central and lead-out faces 132, 133 and 134 slidably engagable by the head 114 of each carrier 112 as it orbits therepast in response to rotation of the central shaft 52. Prior to encountering the cam 131, two of the three blades 103 on a given support shaft 100 orbit with their radially outer edges sliding along the inner face 102 of the filter sleeve 45, namely a doctor blade 103A and a wiper blade 103B at respective positive and negative rake angles to the filter element sleeve inner face 102. In the embodiment shown, the doctor blade 103A (FIG. 5A) leads and is at an obtuse angle to the filter element face 102 ahead of the carrier 112 and the wiper blade 103B trails and is at an acute angle to the filter element face 102 behind the orbiting carrier 112. A third blade 103C extends inward away from the filter element inner face 102, in an idle position where process liquid flowing downward strips off solids accumulated in a prior orbit in contact with the filter element inner face 102. The support shaft 100 will pivot about its length axis and the corresponding compression spring 120 will longitudinally expand to the extent needed to reach an equilibrium position in which the blades (for example, blades 103A and 103B) have their outer longitudinal edges pushed against the inner face 102 of the filter sleeve 45 in their spraddled conditions shown in FIG. 5A. This is a stable, or equilibrium, position for the support shaft 100 and the radially outermost two of its blades.

Figure 4A:
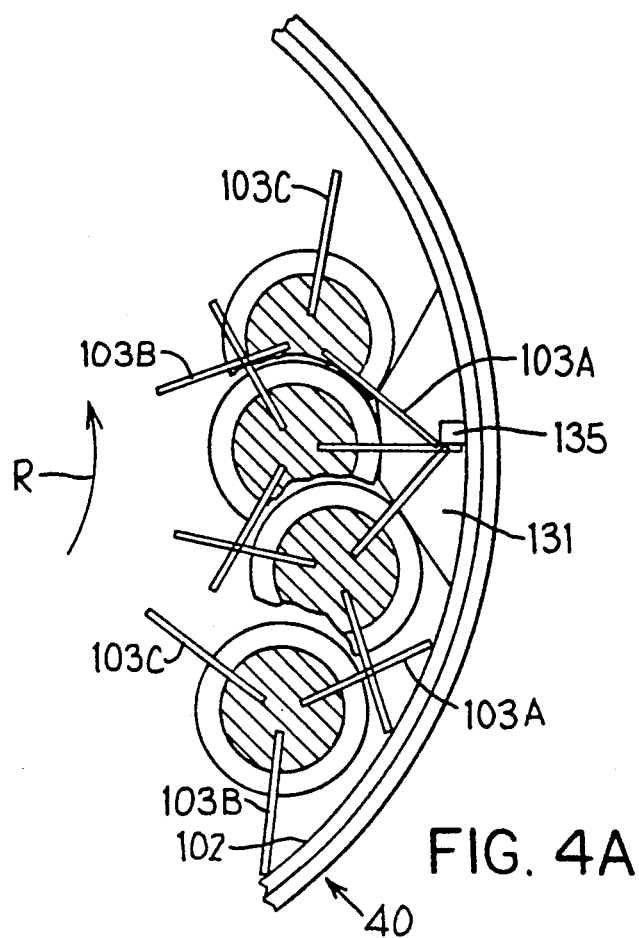
FIG. 4A is a sectional view substantially taken on the line 4A—4A of FIG. 2 showing a sequence of cleaning unit positions during indexing.

The cam 131 is arranged to engage the outer surface of the carrier head 114 and ramp it radially inward against the corresponding compression spring 120 as such head 114 orbits (in a clockwise direction R in FIG. 4A). As orbiting continues, the cam 131 lifts the head 114 and its blade support shaft 100 radially inward sufficient that any blade 103 (such as blade 103A indicated in broken line in the rightward portion of FIG. 4) extending radially straight outward from the center shaft 52 will slightly radially clear the inner face 102 of the filter sleeve 45.

A vertical tripper bar 135 (FIG. 4A) is fixed, as by welding, to the inner face 102 of the filter sleeve 45 and extends between the top and bottom collars 41 and 43 of the filter element 40, in alignment with the top and bottom cams 131. As the rightward carrier head 114 slides orbitally along the central face 133 of the cam 131, its leading blade 103A will encounter the tripper bar 135 and be momentarily stopped thereby. As the carrier head 114 continues its counterclockwise orbit along the center face 133 of the cam 131 and onto the leadout ramp 134 thereof, the tripper bar 135 clockwise pivots the leading blade 103A and the corresponding support shaft 100 about the vertical axis of the latter and with respect to the carrier head 114. As the orbiting continues, and the carrier head 114 slides down the lead-out face 134 of the cam, the previously idle blade 103C pivots clockwise on the carrier 114 to engage the inner face 102 of the filter sleeve 45 beyond the cam 131. Further orbiting of the carrier head 114 advances the radially outer end of the now-trailing blade 103A over and beyond the tripper bar 135. The corresponding spring 120 expands, as the carriage head 114 leaves the cam 131, to press the outer edges of the blades 103A and 103C against the inner face 102 of the filter element 40. This sequence of steps can be seen in FIG. 4A. The result is an indexing, by the cam 131 and tripper bar 135, of the blade support shaft 100 pivotally with respect to the orbiting carrier head 114 to bring the previously idle blade 103C into leading (doctoring) contact with the filter element inner face 102, to bring the previously leading blade 103A into trailing (wiping) contact with the filter element inner face 102 and to place the former trailing blade 103B into an idle, self-cleaning position remote from the filter element inner face 102 and in the flow of liquid to be filtered.

The height (radial thickness) of the cam 131 must be sufficient to allow the blades 103 to clear the inner face 102 of the filter sleeve regardless of the pivotal position of the support shaft 100 and its blades 103. The radially inward height and circumferential location of the tripper bar 135 with respect to the cam 131 and the slope of the cam lead-in ramp are selected so that the leading blade 103A must collide with the tripper bar and pivot the support shaft 100 enough that the former leading blade 103A becomes the trailing blade and the former idle blade 103C approaches the leading blade position at the inner face 102 of the filter sleeve. The cam preferably keeps the carrier head 114 away from the filter sleeve inner face 102 until the now trailing blade 103A has cleared the tripper bar 135. Further, the cam lead-in ramp 132 has to be steep enough that the leading blade 103A cannot skip over the tripper bar 135, yet shallow enough as to limit the increase in the torque required to rotate the head 114 past the cam 131. The pressure of the spring 120 must be enough to maintain the blades 103A and 103B against the filter element inner face 102 for cleaning the latter, but not so much as to prevent the head 114 from riding up the lead-in ramp 132 during indexing.

Further, it is desirable to limit the circumferential length of the cam 131 since, while the carrier head 114 rides on the cam 131, the blades 103 are not pressed against the filter element inner face 102 by the spring 120.

To permit occasional flushing of the filter element 40, a flush liquid pipe 146 connects to the valve 21A. Further, a bridging conduit 147 connects the valves 23A and 30A (FIG. 2).

OPERATION

During normal filtering operation, process liquid from pipe 24 is led through valve 21A into the top portion 14 of the casing 12 (FIG. 2) and down into the interior of the filter element 40. The process liquid is under pressure and flows radially outward through the porous filter sleeve 45 and thence out through the valve 23A into the filtered liquid pipe 25, leaving filtered-out solids on the inner face 102 of the filter sleeve 45. The valves 21A, 23A and 30A of FIG. 2 are in their positions schematically shown and there is no flow from the backwash pipe 146 to the filter housing 11 or away from the filter housing 11 to the drain pipe 26.

During such filtration, the rotate motor 61 and speed reducer 62 rotate the stub shaft 68, coupler 80, central shaft 52 and thus the remainder of the rotor 51, for example, in the counterclockwise direction as seen in FIG. 4.

The rotating central shaft 52 orbits the carriers 112 and their blade support shafts 100. Each leading blade 103A moves ahead of its carrier 112 along the interior face 102 of the filter element in a doctor-like manner. Solids material scraped from the filter element tends to build up (See FIG. 5A) in the obtuse angle between the leading face of the blade 103A and the filter element face 102. Simultaneously, the trailing blade 103B wipes the filter element inner face 102 and solids tend to build up in the acute angle between the leading face of the trailing blade 103B and the filter element inner face 102.

If such solids build-ups were allowed to continue over many rotations of the central shaft 52, eventually the blades 103A and 103B would lose cleaning efficiency. For example, the trailing blade 103B may ride up over a too large collected mass of solids in front of it. Also, the leading blade 103A may become more difficult to push forward along its orbit with a too large mass of solids in front of it.

These problems are solved by the present invention which indexes the blades 103 on each support shaft 102 at least once per orbit (at least once per revolution of the central shaft 52). Indexing of the blades 103 by means of the cam 131 and tripper bar 135 is described in detail above and need not be repeated here. The result of indexing is that the idle blade 103 (from which solids masses have been flushed by process liquid since the last indexing) substitutes for the doctor blade 103A, which in turn substitutes for the wiper blade 103B, which in turn pivots to idle position in substitution for the idle blade 103C.

The present invention has some additional beneficial results, as follows. As the leading blade 103A slides over the tripper bar 135 during indexing, solids on the front of the blade 103A tend to be scraped off by the tripper bar, at least partially cleaning the blade 103A. Further, as the trailing blade 103B pivotally indexes clockwise out of contact with the filter element inner face 102, solids masses built up in the acute angle therebetween during wiping tend to be flushed from the separated blade 103B and filter element inner face 102 by incoming process liquid which moves downward therealong. In the downward flowing stream of process liquid, the built-up masses of solids on the blade 103B and opposed inner face 102 of the filter element are less stable than the conventional thin but widely spread accumulation of filtered-out solids on an unscraped and unwiped filter element. Further, whereas the pressure of liquid trying to flow out through the pores of the filter element 40 would tend to press a thin continuous blanket of solids on the inner face 102 thereof by reason of the pressure drop from inside to outside the filter sleeve 45, the accumulated masses of solids filter inner face 102, and particularly on the blade 103B indexing clockwise away from the filter element inner face 102, are much less stable. Thus, such unstable built-up masses of solids tend to fall off the filter element inner face 102 and off the now idle blade 103B down through the hollow interior of the filter element and collect in the bottom cap 20 over time. The blade indexing structure of the rotating cleaning unit 50 will tend to prevent loss of filtering efficiency over a long period of time. However, it may eventually be desired to flush the filter element 40 and the interior of the housing 11 with water or some other suitable solvent, to further clean the structure within the housing 11 and also to flush away solids which have collected over time in the bottom cap 20 of the housing 11.

To do so, the valves 21A, 23A and 30A (FIG. 2) are rotated 90° clockwise from their positions shown. This isolates the process liquid and filtered liquid pipes 24 and 25 from the remainder of the apparatus and allows flush liquid (for example, water) under pressure to pass through the valve 21A into the top portion 14 of the housing 11 and then downward into the interior of the filter element 40, and out the bottom thereof through the now open valve 30A to the drain pipe 26, to flush away any solids remaining on the inner face 102 of the filter sleeve 45 and on the rotating cleaning unit 50, including the blades 103 thereof, and to further flush away fallen solids which have accumulated in the bottom cap 20. In addition, flushing liquid passing radially outward through the filter sleeve 45 fills the casing 12 outside the filter element 40 and carries away any minor solids accumulations and residual filtered liquid out through the outlet conduit 23, the clockwise shifted valve 23A, the bridging conduit 147, the clockwise shifted valve 30A and thence to the drain pipe 26. It is possible and indeed desirable to energize the motor 61 to rotate the rotating cleaning unit 50 during such flushing to even more thoroughly clean off the filter sleeve 45 and blades 103. After flushing is completed, valves 21A, 23A and 30A may be returned clockwise to their normal filtering position. To assure that all flushing liquid is removed from the housing 11, clockwise return of the valves 23A and 30A may be delayed briefly. Such flushing is also desirable when changing from one process liquid to another.

From time to time, it may be desired to remove the structure within the housing 11, for example, to examine same, subject same to a meticulous hand cleaning, replace worn parts, or for any other reason. This is readily and quickly accomplished by loosening the wing nuts 88 (FIG. 3) and lifting off the shroud 85 to expose the nuts 14. Removal of the nuts 14 permits the cover 16, with its liner 56, seal unit 70 and stub shaft 68, together with the motor 61 and speed reducer 62 thereon, to be lifted off the housing flange 53.

The rotor 51 is rotated to a position where the blades 103 and heads 114 do not interfere axially with the upper cam 131 (for example, a position at 90° to their FIG. 4 position). One can then grip the top of the central shaft 52 and pull it upward, thereby sliding the rotating cleaning unit 50 up out of the filter element 40 and thence up out of the casing 12. The springs 120 will tend to push the heads 114 apart but the extent of this can be limited by limiting the extended (relaxed) length of the springs 120, so that the rotating cleaning unit 50 can be lifted out through the annular flange 53 without difficulty. The bellows sleeves 123 positively prevent separation of the carriers 112 from the central sleeve 110.

Thereafter, by pulling upward on the U-shaped rods 90, the filter element 40 can also be lifted out of the casing 12 through the annular flange 53.

Reassembly of the apparatus is by reversal of the foregoing steps.

MODIFICATION

Attention is directed to FIGS. 7, 8, 8A and 9 showing a modified indexing structure 130F. The latter omits the cam 131 and tripper bar 135 of FIG. 4 and substitutes a rigid metal trough 150. The trough 150 protrudes radially beyond the outer face of the filter sleeve 45F. The trough extends vertically substantially the height of the filter sleeve 45 and slightly above and below the top and bottom edges of the blades 103. The trough 150 has its top and bottom ends fixed to the top and bottom collars 41 and 44. A slot 152 opens through the peripheral wall of the filter sleeve and has edges coextensive with the side, top and bottom edges of the trough 150, so that the interior of the trough is a radially outward continuation of the interior of the filter element sleeve 45F. The trough 150 is welded continuously around its edges to the filter sleeve 45F in a rigid sealed manner so that process liquid to be filtered, lying within the interior of the filter sleeve 45, cannot escape radially outward into the outer portion of the casing through the trough 150.

Figure 9:
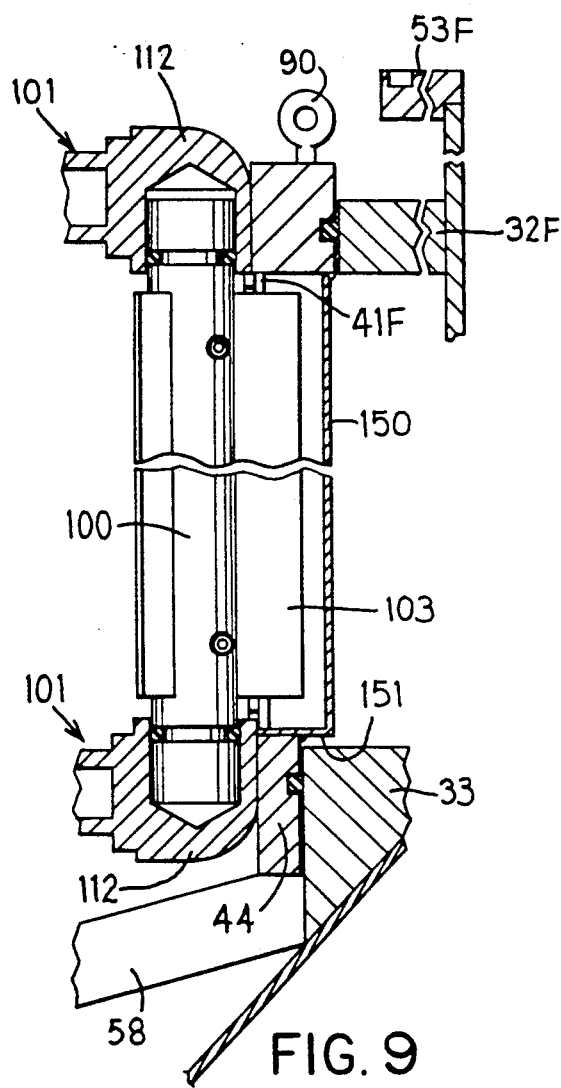
FIG. 9 is a fragmentary sectional view substantially taken on the line 9—9 of FIG. 7.
Figure 9A:
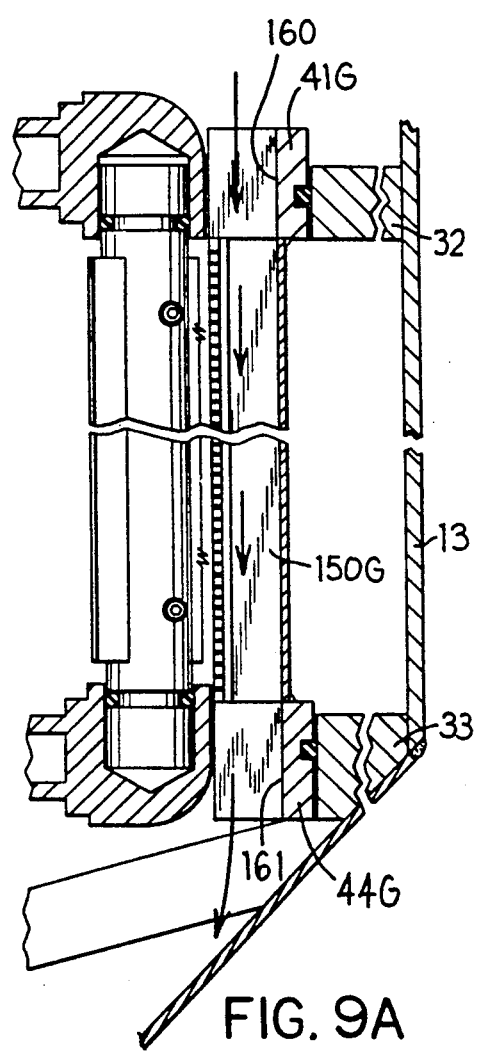
FIG. 9A is similar to FIG. 9 but shows an alternative trough which opens vertically.

In the FIG. 9 embodiment, the top and bottom of the trough are closed by the top collar 41F and by a radially outward extension 151 of the bottom collar 44. This minimizes the outer diameter of the filter element and thus of the housing. However, as seen in the FIG. 9A alternative, to reduce the possibility of solids build up in the upper and lower corners of the trough, the interior cavity of the trough can be instead continued upward and downward through the height of the top and bottom collars 41G and 44G by means of radially inward facing recesses 160 and 161 (FIG. 9A), respectively. The recesses 160 and 161 conform to the cross-sectional size and shape of the interior of the trough 150G and continue same vertically. The radial thickness of the collars 41G and 44G is sufficient to radial space the surrounding seal rings 43G from the recesses 160 and 161.

The modified embodiment of FIGS. 7, 8, 9 and 9A differs in indexing operation from the FIG. 4 embodiment above discussed, as follows. FIG. 8 shows a series of six sequential positions I–VI which may be assumed by a given carrier 112, its support shaft 100 (shown in cross section, but not cross hatched, to avoid crowding) and one or more of the blades 103 thereof.

As seen in FIG. 8, at position I, the carrier 112 has orbited counterclockwise to bring the outer edge of its leading blade 103A to the near (leftward) edge of the slot 152 opening into the trough 150.

The carrier 112 continues counterclockwise orbiting which allows the outer edge of the leading blade 103A to drop radially outward into the slot 152 (position II). Since the carrier 112 is no longer supported in spaced relation from the inner face 102 of the filter element 40 by the outer edges of its blades 103 and 103B bearing thereon, the carrier 112 also drops radially outward to abut the inner face of the filter element 40 (and more particularly of the top collar 41 thereof). The outer edge of the leading blade 103A is now truly trapped in the slot 152 and trough 150, since any pivoting of the support shaft 100, whether clockwise or counterclockwise, cannot remove the leading blade 103A from the slot 152.

Continued orbiting of the carrier 112 moves the support shaft 100 across the slot 152 and trough 150 until at some point the outer edge of the leading blade 103A collides with the far (rightward) side of the slot 152 or trough 150, such occurring at position III in the embodiment shown. It will be recognized that some pivoting of the support shaft 100 may occur between positions II and III due to, for example, the press of process liquid to be filtered against the blades 103A–103C, but that cannot affect the outcome of the indexing operation.

As the carrier 112 continues clockwise orbiting, the right side of the slot 152 positively prevents the leading blade 103A from moving rightward therebeyond and so positively clockwise pivots the blade support shaft 100 with respect to the orbiting carrier 112 (position IV). During the transition from position III to position IV, the leading blade 103A is seen to penetrate more deeply (further radially outwardly) into the trough 150. The clockwise pivoting of the blade support shaft 100 with respect to the carrier 112 pivots the idle blade 103C clockwise and thus radially outward toward the inner face 102 of the filter element 40 (to avoid crowding, the blade 103C is not shown in positions III and IV).

Continued orbiting of the carrier 112 counterclockwise drags the leading face of the formerly leading blade 103A over the rightward edge of the slot 152. The slot 152 edge scrapes accumulated solids off the leading face of the blade 103A (positions IV, V and VI) to at least partially clean same, preparatory to having it complete a further orbit as a trailing (wiper) blade.

As the carrier 112 orbits counterclockwise (rightward in FIG. 8) from its position V toward its position VI, the outer edge portion of the blade 103A is dragged over the right edge of the slot 152. This positively clockwise pivots the support shaft 100 enough to pivot the outer edge of the previously idle blade 103C into contact with the inner face 102 of the filter element 40, so that the previously idle blade 103C becomes the leading (doctor) blade, the previously leading blade 103 becomes the trailing blade, and the previously trailing blade 103B becomes the idle blade. Also, emergence of the outer edge of the now trailing blade 103A from the slot 152 and onto the inner face 102 of the filter element, cooperates with the bearing of the outer edge of the blade 103C against the filter element inner face 102 to force the carrier 112, against the resilient urging of the spring 120 (FIG. 4), radially inward away from contact with the filter element inner face 102 (position V) to its normal cleaning position (position VI).

The former trailing (wiper) blade 103B, having pivoted to the idle position away from the filter element inner face 102, is now subject to removal of any solids masses built-up thereon while wiping during the prior orbit, by inflowing process liquid to be filtered.

Figure 7:
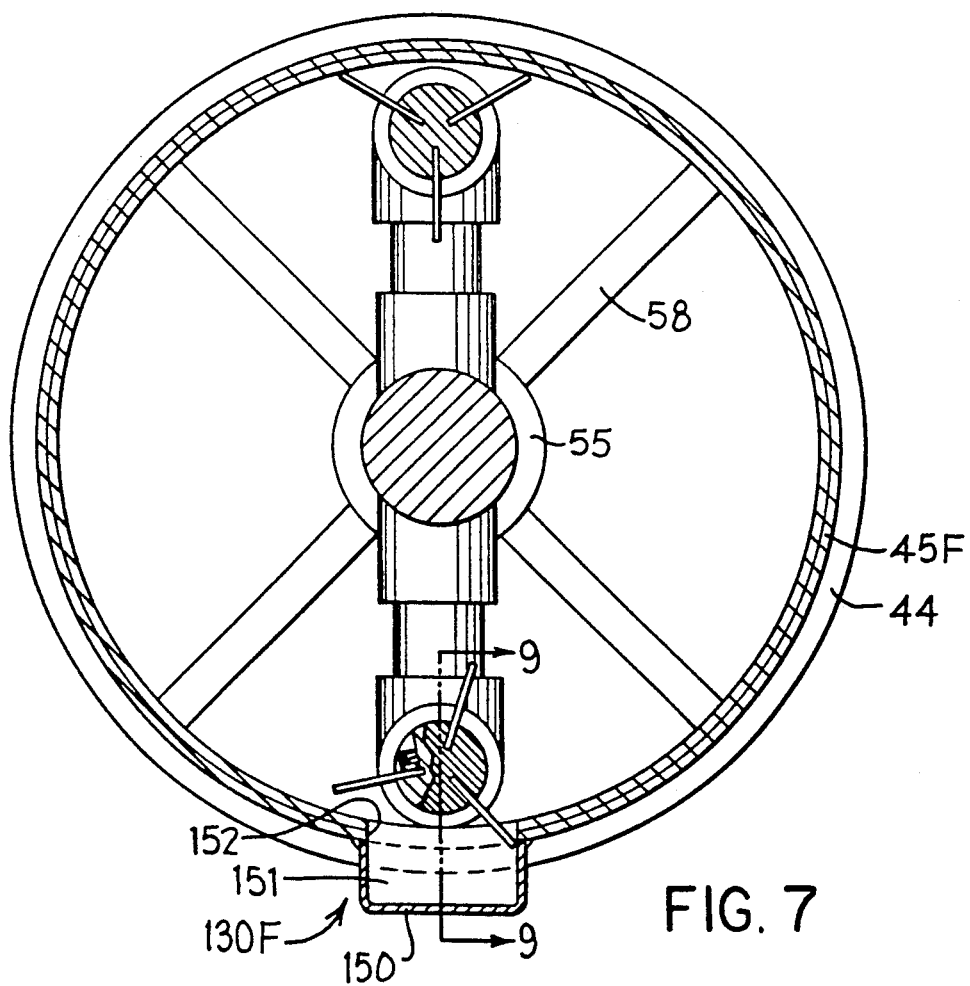
FIG. 7 is a sectional view similar to FIG. 4 and showing a modification.
Figure 8:
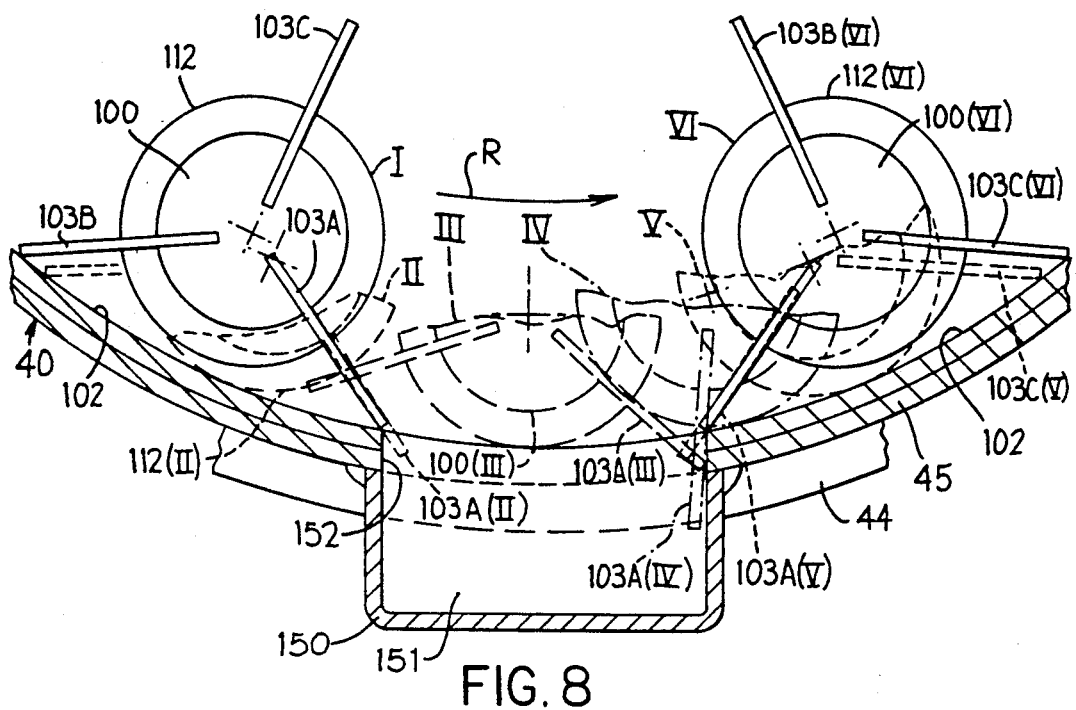
FIG. 8 is an enlarged fragment of FIG. 7 and showing a sequence of cleaning unit positions during indexing.
Figure 8A:
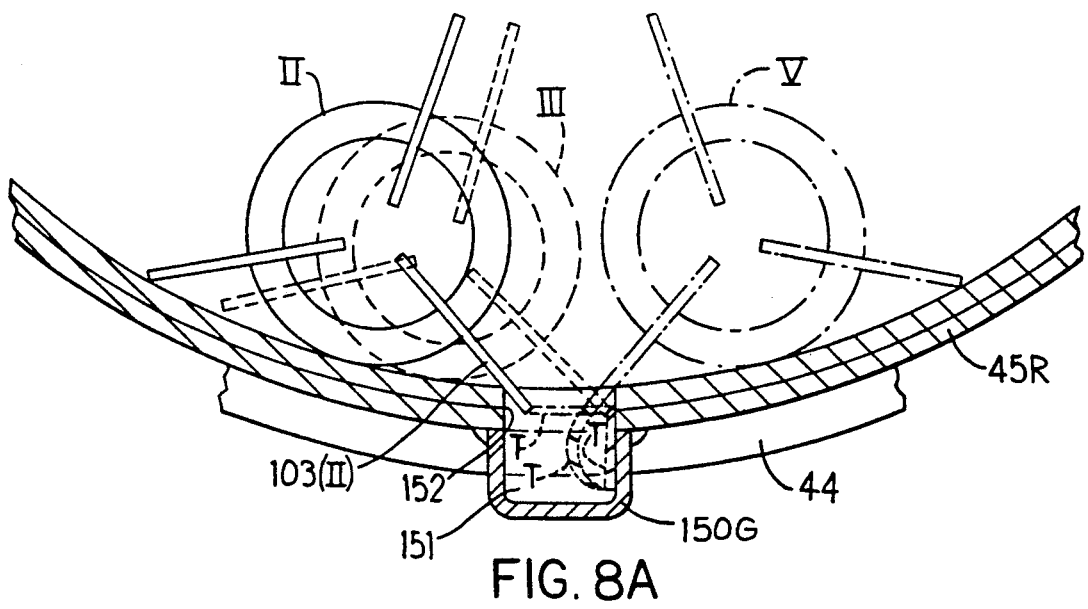
FIG. 8A is a view similar to FIG. 8 but modified to narrow the trough of the cleaning unit.

The FIGS. 7-9 indexing structure at 150, 152 avoids the FIG. 4 embodiment's need to push the carrier 112 radially inward beyond its normal cleaning position, since it eliminates the cam 131 and tripper bar 135. Thus, the average and peak torques required to continuously orbit the rotor are substantially less in the FIG. 7, 8 embodiment than in the FIG. 4 embodiment. Further, without changing the indexing structure 150, 152 in any way, the orbit direction of the rotor 51 may be selected as either counterclockwise (as in the described example) or clockwise.

On the other hand, the FIG. 8 trough 150 and slot 152 may complicate somewhat the construction of the filter element 40. Further, the outward radial extent of the trough 150 should be minimized to avoid collision with the casing upper ring 32 and casing flange 53, so that the filter element 40 can be installed and removed from the casing. These difficulties can be avoided by somewhat enlarging the inside diameter of the upper ring 32 and flange 53 as seen in FIG. 2 and by correspondingly increasing the outside diameter of the filter element top collar 41 to cover the top of the trough 150 as seen in FIG. 9 at 41F.

The solids, scraped off the blade 103A during the transition from positions IV to VI, tend to fall downward through the trough 150 and into the bottom cap 20 for periodic removal as above discussed with respect to FIG. 2.

The circumferential width of the trough 150 removes some of the filtering area of the filter element 40. However, only a small percentage of the filtering area is lost, even when the trough 150 is relatively wide as seen in FIG. 8 (about 1¼ inch width for an approximately 8 inch diameter filter element). However, the trough easily can be made narrowed circumferentially, e.g., in FIG. 8A down to about ⅜ inch wide for an 8 inch diameter filter element. The path of the radially outer edge of leading blade 103 normally moves along a trace T indicated in broken lines within the trough 150G of FIG. 8A and shaped somewhat like a capital letter P which has fallen over forward on its head (pivoted 90° clockwise from normal position). Despite its narrowness, it will be seen that the trough 150G of FIG. 8A could be reduced still further in width and still function properly.

FURTHER MODIFICATION

Figure 10:
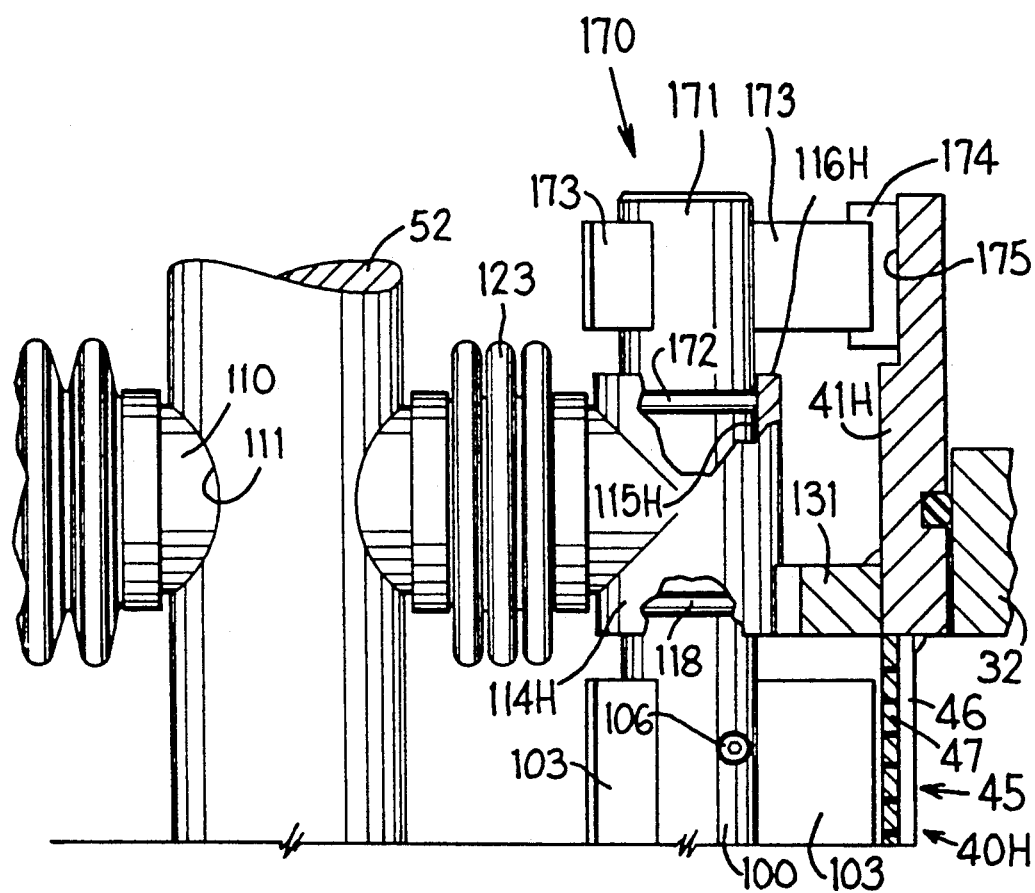
FIG. 10 is a view similar to FIG. 5 but showing a further modification.

FIG. 10 shows a further modification of the FIG. 1-6 embodiment. The FIG. 10 embodiment retains the cam 131 of FIG. 5 but omits the blade engaging tripper bar 145 of FIG. 5.

Instead, an indexing structure 170 entirely separate from the blades 103 is employed in FIG. 10.

More particularly, as seen in FIG. 10, an upward extension 171 of the blade support shaft protrudes upward through and beyond the upper end 116H of the head 114H. The head upper end 116H is not rounded in elevation as in FIG. 5, but rather defines a horizontal plane perpendicular to the vertical axis of the head 114H. An annular seal 172, for example an O-ring, on the shaft extension 171 seals against the interior peripheral wall of the corresponding bearing recess 115H, just below the top 116H of the head 114H, and acts like the O-ring seal 118 of FIG. 6 to prevent process liquid from entering the bearing bore 115H.

The indexing structure 170 of FIG. 10 more specifically comprises a plurality of indexing arms 173 fixed to and protruding generally radially from the upper extension 171 of the shaft 100, and an upstanding tripper bar 174 fixed to and extending radially inward from the top collar 41H of the filter element 40H. The indexing arms 173 and tripper bar 174 of FIG. 10 may be of any desired dimension and location on their respective shaft extension 171 and top collar 141H, as long as they cooperate with each other in synchronism with the interengagement of the head 114H and cam 131 to produce indexing in the manner illustrated above in FIGS. 4, 4A, 5 and 5A.

For the sake of simplicity in description, the present indexing arms 173 and tripper bar 174 in FIG. 10 are shaped and circumferentially located, as seen from above, in the same manner as the blades 103 and tripper bar 135 of FIG. 4A. Thus, the indexing arms 173 as seen from the top of FIG. 10 map directly on the corresponding blades 103, and the tripper bar 174 would map on the FIG. 4A tripper bar 135 except for the omission of the latter in the FIG. 10 embodiment. The FIG. 10 apparatus thus operates in the same manner as described above with respect to FIG. 4A except that the blades 103 themselves do not cause the indexing.

In the particular embodiment shown in FIG. 10, the upper portion of the inside face of the top collar 41H is recessed throughout its circumference at 175, so that the indexing arms 173 do not touch the top collar 41H as the shaft 100 and head 114H orbit. Thus, it is still the blades at 103 that determine the pivotal position of the shaft with respect to the head 114H in those portions of the orbit wherein the head 114H is out of contact with the cam 131.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A self-cleaning filter, comprising:
    a housing having an inlet port for process liquid to be filtered and an outlet port for filtered liquid;
    a cylindrical filter element in said housing, the interior of the filter element being in communication with the inlet port and the exterior of the filter element being in communication with the outlet port;

a rotating cleaning unit mounted for rotation coaxially within the filter element, the cleaning unit comprising an eccentric support located adjacent to and movable circumferentially along the inside face of the filter element upon rotation of the cleaning unit within the filter element;

blades mounted on said support and parallel to the length axis of said filter element, at least a first said blade being in cleaning contact with the inside face of said filter element and movable circumferentially therealong during rotation of said cleaning unit for removing filtered-out solids therefrom;

indexing means for removing the first blade from cleaning contact with the inside face of the filter element and substituting a second said blade and cleaning the first blade for future use, the indexing means comprising means for resiliently urging said support toward the inside face of the filter element and permitting said support to be displaced radially inward toward the axis of rotation of the cleaning unit and away from the inside face of the filter element against such resilient urging, said indexing means further including camming means fixed with respect to said filter element for pushing said blade support inward away from the inside face of the filter element at least at one point along the circumference of said filter element, and tripping means associated with said camming means and cooperable with said blades and support for carrying out said removing of said first blade and substituting of said second blade as the camming means momentarily shifts the blade support inward away from the interior face of the filter element.

2. The apparatus of claim 1 in which the camming means comprises a pair of cams respectively mounted at the top and bottom of the inside face of the filter element, said cleaning unit including top and bottom members rotatable on the rotation axis of the cleaning unit and extending out to said support, said support comprising an upstanding member carried by and located vertically between said radially outwardly extending members, said top and bottom members being collapsible to allow said support to move in and out between said rotation axis and the interior face of the filter element, said means for resiliently urging comprising resilient means for resisting such inward movement and promoting such outward movement.

3. The apparatus of claim 2 in which said support is pivotable with respect to said top and bottom members, said blades being carried substantially rigidly on said support such that pivoting of said support indexes said blades, said tripping means comprising a tripping member fixed with respect to said filter element for engaging a given one of said blades and tending to retard its rotation along the inside face of the filter element with respect to the remainder of the cleaning unit, as the cleaning unit rotates on said rotation axis with respect to the filter element, so that the thus retarded blade tends to pivot the support and hence the blades carried by said support with respect to the inside face of the filter element and thereby remove said first blade from cleaning contact with the filter element and substitute said second blade.

4. The apparatus of claim 3 in which said tripping member comprises a bar extending along the inside face of the filter element in an axial direction and across which a given said blade drags during indexing to help scrape filtered-out solids off the last-mentioned blade.

5. The apparatus of claim 4 in which the first blade, when removed from cleaning contact with the inside wall of the filter element, has an idle position displaced inward from the inside face of the filter element and in a stream of liquid to be filtered passing axially along the interior of the filter element, such that the flow of liquid to be filtered along the blade in cleaning position tends to flush built-up solids off the blade.

6. A self-cleaning filter, comprising:

a housing having an inlet port for process liquid to be filtered and an outlet port for filtered liquid;

a cylindrical filter element in said housing, the interior of the filter element being in communication with the inlet port and the exterior of the filter element being in communication with the outlet port;

a rotating cleaning unit mounted for rotation coaxially within the filter element, the cleaning unit comprising an eccentric support located adjacent to and movable circumferentially along the inside face of the filter element upon rotation of the cleaning unit within the filter element;

blades mounted on said support and parallel to the length axis of said filter element, at least a first said blade being in cleaning contact with the inside face of said filter element and movable circumferentially therealong during rotation of said cleaning unit for removing filtered-out solids therefrom;

indexing means for removing the first blade from cleaning contact with the inside face of the filter element and substituting a second said blade and cleaning the first blade for future use, the indexing means including a circumferentially narrow slot extending axially the substantial length of the inside face of the filter element and means defining a trough protruding radially out from the outside face of the filter element and overlying said first blade while in cleaning contact with the inside face of the filter element being at an acute angle to such inside face and hence angled to a radial plane of the filter element, said first blade being angled toward the direction of circumferential advancement of said cleaning unit with respect to the filter element so that the radially outer edge of the first blade engaging the inner face of the filter element circumferentially leads the radially inner edge thereof supported on the support, said slot in said filter element being sized to receive such leading edge of the first blade in its cleaning position as the first blade orbits along the inside face of the filter element, said slot having an edge which tends to retard rotation of such leading edge of such first blade as it enters said trough to allow the support to move circumferentially ahead of said first blade about a pivot axis of said support and into an idle position for cleaning of said first blade and thereby pivoting the second blade into cleaning contact with the filter element in substitution for the first blade.

7. The apparatus of claim 6 in which the support circumferentially passes said slot as it orbits due to rotation of the cleaning unit within the filter element, said slot edge being located not only to engage the first blade and thereby index the blades, but also to scrape solids from the leading surface of the first blade, said trough being sized and shaped not to impede the radially outer edge of the first blade while said first blade is in said slot, said trough extending substantially the length of said filter element and being open at the bottom thereof for allowing solids removed from the first blade to drop therealong for subsequent removal from near the bottom of said housing.

* * * * *

UNITED STATES PATENT AND TRADEMARK OFFICE
CERTIFICATE OF CORRECTION

PATENT NO. : 5 087 365
DATED : February 11, 1992
INVENTOR(S) : Scott J. DAVIS et al It is certified that error appears in the above-identified patent and that said Letters Patent is hereby corrected as shown below:

Column 4, line 7; change "2," to ---2,)---.
Column 6, line 57; after "recess 115" insert ---.---.

Signed and Sealed this

Thirteenth Day of July, 1993

Attest:

MICHAEL K. KIRK

*Attesting Officer*   Acting Commissioner of Patents and Trademarks

UNITED STATES PATENT AND TRADEMARK OFFICE
CERTIFICATE OF CORRECTION

PATENT NO. : 5 087 365
DATED : February 11, 1992
INVENTOR(S) : Scott J. DAVIS et al It is certified that error appears in the above-identified patent and that said Letters Patent is hereby corrected as shown below:

Column 3, line 31; change "rings 32 and 33" to ---collars 41 and 44---.

Column 4, line 7; change "2," to ---2,)---.

Column 6, line 57; after "recess 115" insert ---.---.

Column 11, line 34; change "U-shaped rods" to ---lift lugs---.

Signed and Sealed this

Seventeenth Day of August, 1993

Attest:

BRUCE LEHMAN

Attesting Officer

Commissioner of Patents and Trademarks